(12) United States Patent
Tanaka

(10) Patent No.: US 9,552,111 B2
(45) Date of Patent: Jan. 24, 2017

(54) TOUCH SENSING DEVICE AND METHOD OF IDENTIFYING A TOUCHED POSITION

(71) Applicant: Japan Display Inc., Tokyo (JP)

(72) Inventor: Hiroshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 40 days.

(21) Appl. No.: 14/172,935

(22) Filed: Feb. 5, 2014

(65) Prior Publication Data

US 2014/0225863 A1 Aug. 14, 2014

(30) Foreign Application Priority Data

Feb. 8, 2013 (JP) ................................. 2013-023528

(51) Int. Cl.
*G06F 3/041* (2006.01)
*G06F 3/044* (2006.01)

(52) U.S. Cl.
CPC ............. *G06F 3/044* (2013.01); *G06F 3/0416* (2013.01)

(58) Field of Classification Search
CPC .................... G06F 3/042; G06F 3/0421; G06F 2203/04109; G06F 3/044; G06F 2203/04104; G06F 2203/04108; G06F 3/0304; G06F 3/0416
USPC ................................................ 345/173–178
See application file for complete search history.

(56) References Cited

U.S. PATENT DOCUMENTS

| 7,030,860 | B1 | 4/2006 | Hsu et al. | |
|---|---|---|---|---|
| 7,030,861 | B1 | 4/2006 | Westerman et al. | |
| 8,445,909 | B2* | 5/2013 | Jeon | H01L 27/1446 257/43 |
| 8,610,683 | B2* | 12/2013 | Cho | G06F 3/044 345/173 |
| 2002/0097910 | A1* | 7/2002 | Guha | G06K 9/222 382/187 |
| 2008/0055275 | A1* | 3/2008 | Orsley | 345/175 |
| 2010/0060602 | A1* | 3/2010 | Agari et al. | 345/173 |
| 2010/0182273 | A1 | 7/2010 | Noguchi et al. | |
| 2012/0075243 | A1* | 3/2012 | Doi | G06F 3/044 345/174 |
| 2012/0268403 | A1* | 10/2012 | Christiansson | 345/173 |
| 2014/0285944 | A1* | 9/2014 | Sato | H01G 4/30 361/277 |

FOREIGN PATENT DOCUMENTS

| JP | 2003-511799 | 3/2003 |
|---|---|---|
| JP | 2009-244958 | 10/2009 |
| WO | WO 01/27868 A1 | 4/2001 |

* cited by examiner

*Primary Examiner* — Andrew Sasinowski
*Assistant Examiner* — Gerald Oliver
(74) *Attorney, Agent, or Firm* — TYPHA IP LLC

(57) ABSTRACT

In a touch sensing device of a capacitive type, touch coordinates are obtained according to a detected signal corresponding to a variation in a mutual capacitance between an X-electrode and a Y-electrode due to a finger touch in each combination of a plurality of X-electrodes and a plurality of Y-electrodes within a sensing area. The theoretical value of the detected signal in each combination of the X-electrodes an the Y-electrodes approximately expressed by a two-dimensional Gaussian function. The touch coordinates are identified correctly by finding the optimal solution of the object function which expresses the sum of squared differences between each of the theoretical signal value and the detected signal value.

5 Claims, 7 Drawing Sheets

TOUCH SENSING DEVICE AND METHOD OF IDENTIFYING A TOUCHED POSITION

CROSS-REFERENCE TO RELATED APPLICATION

The present application claims priority from Japanese application JP2013-023528 filed on Feb. 8, 2013, the content of which is hereby incorporated by reference into this application.

BACKGROUND OF THE INVENTION

1. Field of the Invention

The present invention relates to a touch sensing device and method of identifying the touched position, and more particularly to touch coordinates calculation for a capacitive touch sensing device.

2. Description of the Related Art

In recent years, capacitive touch screen have been used in a large number of devices. U.S. Pat. No. 7,030,860B1 discloses a structure in which a plurality of X-electrodes aligned in an X-direction and a plurality of Y-electrodes aligned in a Y-direction are formed on a single glass substrate as a structure of the capacitive touch screen. JP2009-244958A discloses a structure of a touch sensor in which parts of liquid crystal display elements form Y-electrodes, and X-electrodes are disposed on a glass for liquid crystal display. The touch sensor disclosed in JP2009-244958A does not require the sheet only for the touch sensor. In the touch sensors disclosed in those publications, touch coordinates are obtained according to a detected signal corresponding to a variation in a mutual capacitance between the X-electrode and the Y-electrode due to a finger touch in each combination of the X-electrodes and the Y-electrodes.

As a method for obtaining the touch coordinates, for example, there is a method for obtaining, as the touched position, the centroid calculated with the detected signal as a weight at a center position of a cross portion of each combination of the X-electrodes and the Y-electrodes. The detected signal corresponding to a mutual capacitance variation in each combination of the X-electrodes and the Y-electrodes.

It is conceivable that, when the screen is touched by a finger, there are measurement portions (the cross portion of each combination of the X-electrode and the Y-electrode) in a given range where the detected signal corresponding to a variation in the mutual capacitance is obtained. On the other hand, when the finger touches an end of the above-mentioned sensing area, the detected signal which would be obtained when measurement portions are present outside of the end of the sensing area is not obtained. For that reason, in a case where the end of the sensing area is touched by the finger, a gap between touch coordinates by the centroid calculation, and the actually touched coordinates becomes larger than a case where a neighborhood of the center of the sensing area is touched. Also, a method for correcting the calculated coordinates with some calculation formula is also proposed. However, this method has a limited improvement in a precision of the coordinates.

SUMMARY OF THE INVENTION

The invention has been made in view of the above problem, and an object of the invention is to provide a technique that can identify a touched position with higher precision than a case in which a configuration of the invention is not provided.

An outline of a typical feature of the invention disclosed in the invention will be described in brief below.

(1) A touch sensing device including: a touch sensing unit that measures a value indicative of the degree of an electric influence of a touch on each of a plurality of measurement portions within a sensing area; and a coordinate calculation unit that obtains touch coordinates by calculating the optimal solution of the objective function which expresses the sum of squared differences between each of detection signal values measured at the plurality of measurement portions and each of values calculated by the function that expresses theoretical signal values of each measurement portions versus touch coordinates and touch size.

(2) The touch sensing device according to the item (1), in which the variables further includes a peak value of the function which expresses the theoretical signal values.

(3) The touch sensing device according to the item (2), in which the function is a two-dimensional Gaussian function that has a maximum point at the touch coordinates.

(4) The touch sensing device according to any one of the items (1) to (3), in which the coordinate calculation unit determines whether a first area within the sensing area is touched, or a second area closer to an end of the sensing area than the first area is touched, and the coordinate calculation unit obtains touch coordinates by calculating variables which minimize the objective function based on the difference between each of the detection signal values measured at the measurement portions and each of the values calculated by the function at the measurement portions if it is determined that the second area is touched, and obtains the touch coordinates through a calculation method different from that for the second area if it is determined that the first area is touched.

(5) The touch sensing device according to any one of the items (1) to (4), in which the coordinate calculation unit obtains the touch coordinates so that the error becomes minimal through an iterative solution technique, and the coordinate calculation unit sets the touch coordinates obtained previously as an initial value of the iterative solution technique.

(6) The touch sensing device according to any one of the items (1) to (5), further a touch sensor substrate on which the touch sensing unit and the coordinate calculation unit are mounted, and the coordinate calculation unit further includes a communication unit that transmits a signal indicative of whether to obtain the touch coordinate so that the error becomes minimal to a computer connected to the touch sensor substrate.

(7) A touch screen, comprising: a measurement unit that measures a value indicative of the degree of an electric influence of a touch on each of a plurality of measurement portions within an area where the touch is detected; a storage unit that stores a value indicative of a characteristic of a signal value due to a touch different depending a specification and an individual of the touch screen; and a communication unit that transmits a value measured at the plurality of measurement portions, and a value indicative of the characteristic stored in storage unit to a calculation unit that obtains touch coordinates by obtaining, on the basis of a function for obtaining each theoretical value of the plurality of measurement portions according to a variables including a value indicative of a characteristic of the touch screen, and a value indicative of the touch coordinates and the characteristic, a variables in which an objective function based on a difference between each of detection signal values measured at the plurality of measurement portions and each of values calculated by the function at the measurement portions is minimal to obtain the touch coordinates.

(8) A touch sensing method, including the steps of: measuring a value indicative of the degree of an electric influence of a touch on each of a plurality of measurement portions within an area where the touch is detected; and obtaining touch coordinates by obtaining, on the basis of a function for obtaining each theoretical value of the plurality of measurement portions according to a variables including the touch coordinates, a variables in which an objective function based on a difference between each of detection signal values measured at the plurality of measurement portions and each of values calculated by the function at the measurement portions is minimal.

According to the invention, when the finger touches an end of the sensing area, the touched position can be detected with higher precision than a case in which a configuration of the invention is not provided.

DETAILED DESCRIPTION OF THE INVENTION

Figure 1:
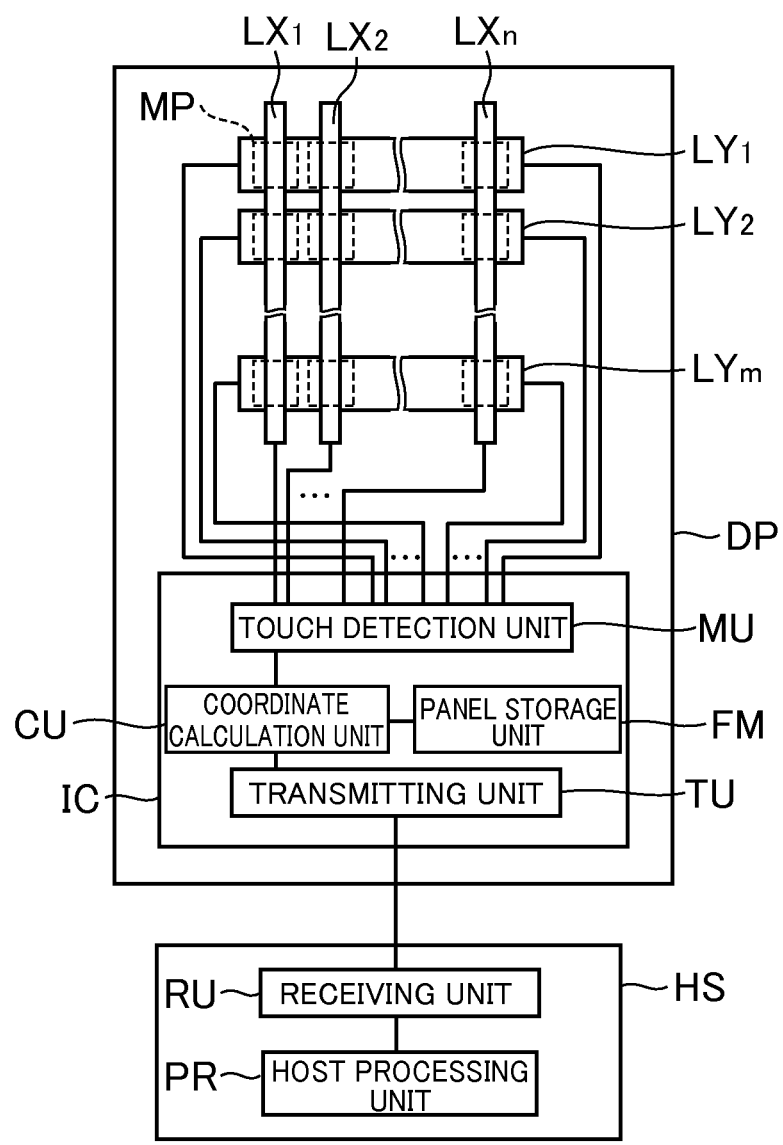
FIG. 1 is a block diagram illustrating an example of configuration of a main function related to touch sensing in a touch sensitive device according to a first embodiment of the invention.

Hereinafter, embodiments of the invention will be described with reference to the accompanying drawings. In the embodiments, components having the same function are denoted by identical reference characters, and their repetitive description will be omitted.

First Embodiment

FIG. 1 is a block diagram illustrating an example of configuration of a main function related to touched position detection in a device with a touch screen according to a first embodiment of the invention. The device with the touch screen is, for example, a smartphone, a tablet device, or a personal computer with a touch screen. The device with the touch screen includes a display panel DP with a touch sensor, and a host substrate HS. The display panel DP with the touch sensor is, for example, an in-cell touch screen of a liquid crystal display panel or an organic EL display panel, and a sensitive area of the touch sensor is disposed in correspondence with a display area thereof.

A plurality of X-electrodes LX and a plurality of Y-electrodes LY which are common to drive electrodes for display, an integrated circuit package IC, and a memory FM are disposed on a display panel DP with a touch sensor. The X-electrodes LX are aligned in a lateral direction, extend in a vertical direction, and are denoted by $LX_1, LX_2, LX_n$ from the left. The Y-electrodes LY are aligned in the vertical direction, extend in the lateral direction, and are denoted by $LY_1, LY_2, LY_m$ from above. For example, each of the number n of X-electrodes LX and the number m of Y-electrodes LY is about 10 to 30.

A touch detection unit MU, a coordinate calculation unit CU, a transmitting unit TU, and a panel storage unit FM are implemented in the integrated circuit package IC. The touch detection unit MU includes apart of the display control circuit, and a touch detection circuit, and is connected to the Y-electrodes LY which are common to drive electrodes for display, and the X-electrodes LX. The touch detection unit MU acquires a detected signal corresponding to a variation in each mutual capacitance of measurement portions MP which are arranged at cross points of the X-electrodes LX and the Y-electrodes LY in a matrix. The coordinate calculation unit CU is realized by a processor incorporated into the IC, and calculates coordinates (touch coordinates) indicative of a position touched by the finger according to the detected signal at each of the measurement portions MP. The calculation method will be described later. The transmitting unit TU transmits information on the calculated touch coordinates toward a host substrate HS. The panel storage unit FM is configured by a nonvolatile memory and a DRAM, and stores calculation results from the processor, and programs therein.

The host substrate HS is a type of computer, and includes a host processing unit PR and a receiving unit RU. The receiving unit RU is connected to a transmitting unit TU of the display panel DP with the touch sensor, and receives information on the touch coordinates transmitted from the transmitting unit TU. The host processing unit PR corresponds to a processor and a memory, analyzes operation of a user according to the received information on the touch coordinates and an image displayed on the screen, and instructs the overall device on the image to be displayed on the screen or a communication with an external of the device according to the operation. With the above configuration, the device with the touch screen having the host substrate HS can provide the user with the image or the information, or help the user to create various contents.

Figure 2:
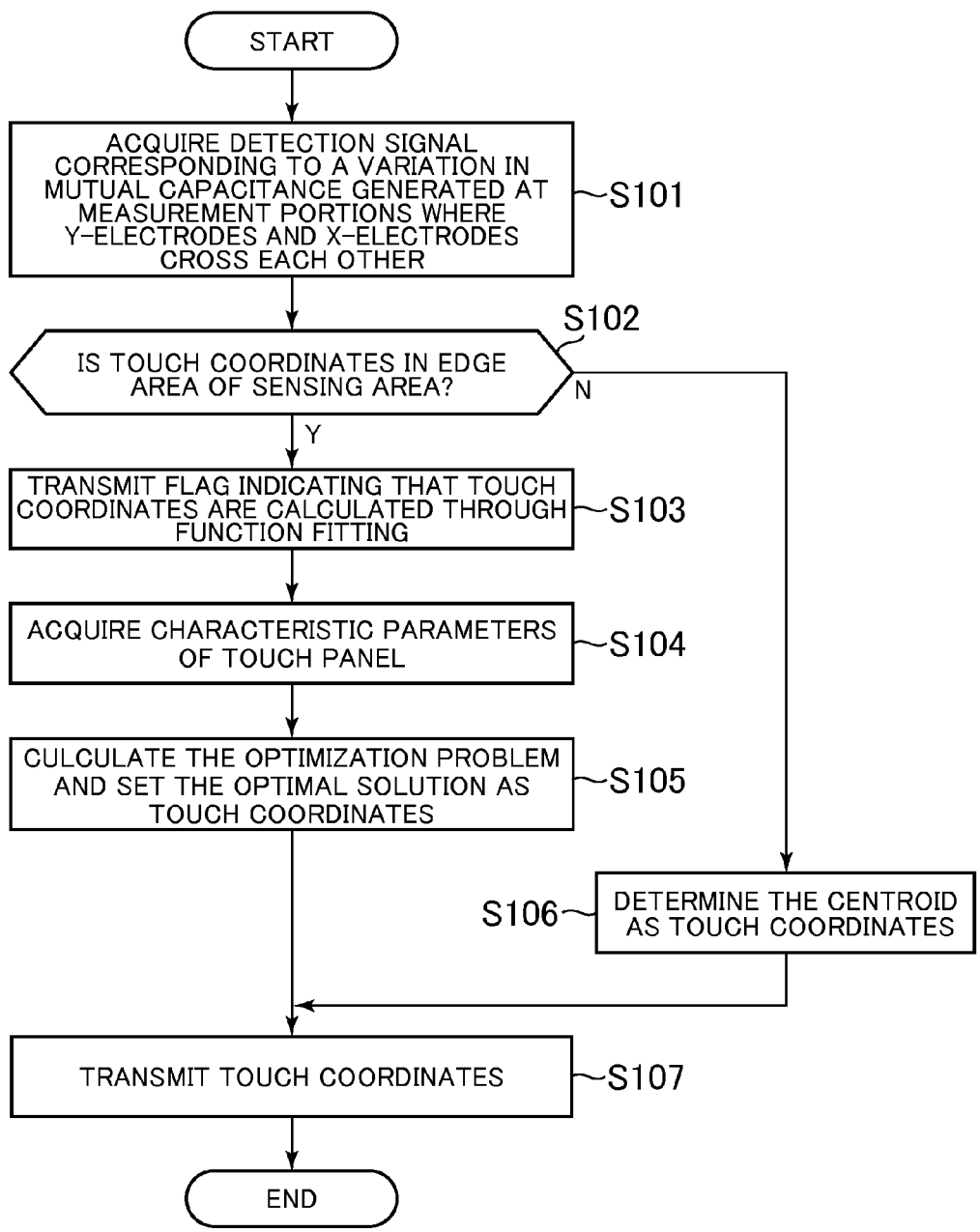
FIG. 2 is a diagram illustrating an example of a processing flow of a touch detection unit, a coordinate calculation unit, and a communication unit.

Hereinafter, a description will be given of processing of acquiring the respective touch detected signals of the measurement portions MP, and calculating the touch coordinates. FIG. 2 is a diagram illustrating an example of a processing flow of the touch detection unit MU, the coordinate calculation unit CU, and the communication unit TU. The processing illustrated in FIG. 2 is processing for obtaining the touch coordinates once, and this processing is repetitively conducted at various times with time.

First, the touch detection unit MU acquires the respective touch detected signals from the plural measurement portions MP at which the X-electrodes LX and the Y-electrodes LY cross each other (Step S101). More specifically, the touch detection unit MU supplies pulse signals to the Y-electrodes LY in sequence, and measures an integral value of currents flowing into a detector circuit of the touch detection unit from the respective X-electrodes LX when supplying the pulse signals. As a result, the touch detection unit MU acquires the touch detected signal corresponding to the mutual capacitance variation of each measurement portion MP. A variation in the mutual capacitance has a tendency to become larger as a size of the finger is larger. Then, the touch detection unit MU converts an intensity of the detected signal into a digital value. This value is a detected signal value of a source for a coordinate calculation.

Then, the coordinate calculation unit CU determines whether the position touched by the user s finger is in an edge area close to any corner of a sensing area, or in a center area close to a center thereof (Step S102). The center area is, for example, an area surrounded by a center line of the second X-electrode $LX_2$, a center line of the $(n-1)^{th}$ X-electrode $LX_{n-1}$, a center line of the second Y-electrode $LY_2$, and a center line of the $(m-1)^{th}$ Y-electrode $LY_{m-1}$. The center area may be an area at a predetermined distance from an end of the sensing area. The edge area is an area except for the center area in the sensing area. The edge area is, for example, an area including an area on an end side from the center line of the X-electrode $LX_2$, an area on an end side from the center line of the X-electrode $LX_{n-1}$, an area on an end side from the center line of the Y-electrode $LY_2$, and an area on an end side from the center line of the Y-electrode $LY_{m-1}$.

In Step S102, in order to determine whether the touched position is included in the sensing area or in the edge area, the coordinate calculation unit CU calculates tentative touch coordinates. The tentative touch coordinates represent the centroid of the detected signal values acquired in each of the measurement portions MP. The centroid is obtained assuming that the detected signal values of each measurement portion MP is a value at the coordinates of the center of this measurement portion MP. The respective measurement portions MP are numbered, and when a detected signal value at an i-th measurement portion MP is Di, and coordinates of the i-th measurement portion MP are $(x_i, y_i)$, tentative touch coordinates (Xg, Yg) are obtained by the following expression.

$$Xg = \frac{\sum_i x_i Di}{\sum_i Di} \qquad \text{(Ex. 1)}$$

$$Yg = \frac{\sum_i y_i Di}{\sum_i Di}$$

Then, the coordinate calculation unit CU determines whether the tentative touch coordinates are included in the center area, or in the edge area.

Figure 3:
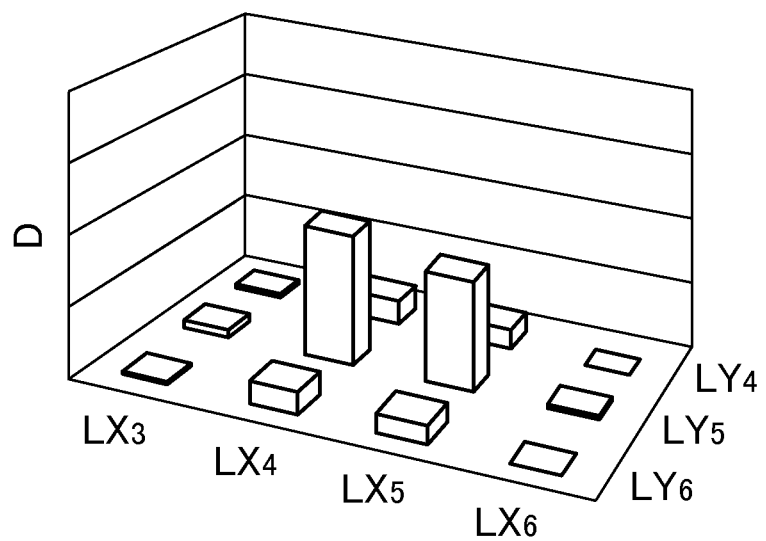
FIG. 3 is a diagram illustrating one example of detected signal values in a part of measurement portions.

FIG. 3 is a diagram illustrating one example of the detected signal values in a part of measurement portions MP. In this case, a peak is present at a measurement portion MP of a position where the fourth X-electrode $LX_4$ and the fifth Y-electrode $LY_5$ cross each other. Since it is conceivable that the tentative touch coordinates calculated by the centroid fall within an area surrounded by the measurement portions MP adjacent to the measurement portion MP of that peak, the touch coordinates fall within the center area.

Figure 4:
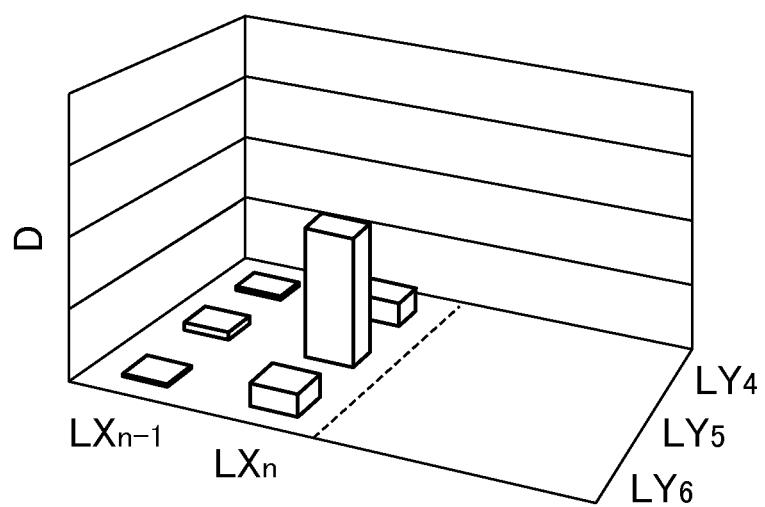
FIG. 4 is a diagram illustrating another example of the detected signal values in a part of the measurement portions.

FIG. 4 is a diagram illustrating another example of the detected signal values in a part of the measurement portions MP. A dashed line in FIG. 4 indicates an end of the sensing area. In this drawing, a peak is present at a measurement portion MP of a position where the n-th X-electrode $LX_n$ and the fifth Y-electrode $LY_5$ cross each other. It is conceivable that the tentative touch coordinates by the centroid calculation are present within an area outside of the X electrode $LX_{(n-1)}$. Hence, the touch coordinates fall within the edge area. In this case, the tentative touch coordinates are present inside of a real touched position.

If the tentative touch coordinates are present in the edge area of the sensing area (Y in Step S102), the touch coordinates which are an estimated value of the touched position are calculated with the use of a function fitting process subsequent to Step S103. On the other hand, if the tentative touch coordinates are present in the center area of the sensing area (N in Step S102), the coordinates of the centroid calculated as the tentative touch coordinates are determined as the touch coordinates (Step S106).

In Step S103, the coordinate calculation unit CU allows the transmitting unit TU to transmit a flag indicating that the function fitting process is conducted to calculate the touch coordinates to the receiving unit RU. Then, the coordinate calculation unit CU acquires the characteristic parameters of the touch screen TP from the panel storage unit FM (Step S104). The characteristic parameters will be described later.

Then, the coordinate calculation unit CU calculates touch coordinates (Xt*, Yt*) with the use of the function fitting. More specifically, the coordinate calculation unit CU obtains an optimal solution (Xt*, Yt*, S*) of an objective function g(Xt, Yt, S) that is a sum of squared differences between a function f expressing a theoretical signal value in each of the measurement portions MP, and a real detected signal value in each of the measurement portions MP, and sets the result as the final touch coordinates (Xt*, Yt*) (Step S105). Then, the transmitting unit TU transmits the calculated or determined touch coordinates toward the receiving unit RU of the host substrate HS (Step S107).

Hereinafter, processing of obtaining the touch coordinates in Step S105 will be described in more detail. The function f expresses a detected signal corresponding to a mutual capacitance variation at a certain measurement portion MP in terms of the touch coordinates (Xt, Yt) and a virtual peak height S. The center of the measurement point is represented by coordinates (x, y). The function f is given by the following expression.

$$f(x, y, Xt, Yt, S) = S \exp\left\{-\left(\frac{Xt-x}{\alpha(S)}\right)^2 - \left(\frac{Yt-y}{\beta(S)}\right)^2\right\} \qquad \text{(Ex. 2)}$$

A function $\alpha$ and a function $\beta$ are approximate polynomials determined according to the specification of the display panel DP with the touch sensor. Those functions are exemplified as follows.

$$\alpha(S) = A_0 + A_1 S$$

$$\beta(S) = B_0 + B_1 S \qquad \text{(Ex. 3)}$$

$A_0$, $A_1$, $B_0$, and $B_1$ are characteristic parameter determined according to the specification and the individual variation of the display panel DP with the touch sensor. The characteristic parameter are determined for each specification by measurement of samples, or individually by measurement during manufacturing, and stored in the panel storage unit FM in advance. The characteristic parameter may be copied in a DRAM from a nonvolatile memory when powering on, or the characteristic parameter may be acquired from the DRAM in Step S104.

Figure 5:
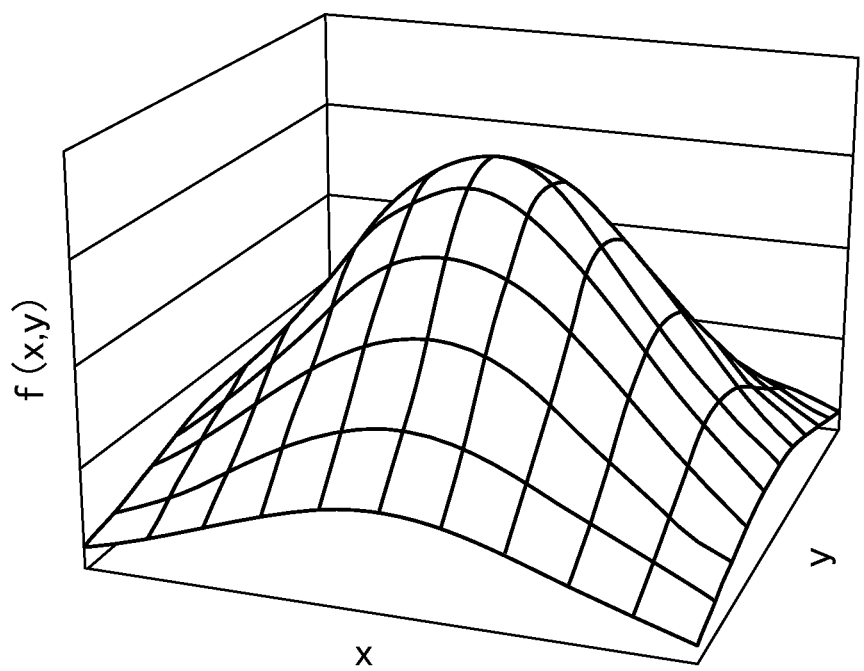
FIG. 5 is a diagram illustrating an example of a relation between coordinates of measurement portions and a function f indicative of a theoretical signal value.

FIG. 5 is a diagram illustrating an example of a function f expressing value of theoretical signal values in term of coordinates (x, y) that is the center of a measurement point MP. The function f indicates a bell shape and has the maximum value S at the touch coordinates (Xt, Yt). Also, the function α and the function β indicate the degree of expansion of a hoot of a mountain of the graph.

With the use of the function f, the objective function g that is the sum of squared differences between the detection signal measured at each of the measurement portions MP, and the value calculated by the function f at each of the measurement portion MP is represented as follows.

$$g(Xt, Yt, S) = \sum_i \{Di - f(xi, yi, Xt, Yt, S)\}^2 \quad \text{(Ex. 4)}$$

Like the above description, Di is a real detection signal value at the i-th measurement portion MP, and $(x_i, y_i)$ is coordinates of the i-th measurement portion MP. Because values of Xt, Yt, and S are variables not determined in the function f at a present time, the objective function g can be regarded as a function of Xt, Yt, and S. The objective function g can be expressed as the sum of squared differences between the measurement value and the theoretical value at each of the measurement portions MP. The objective function g is not always limited to the above function. For example, the values may be weighted according to the positions of the measurement portions MP.

Figure 6:
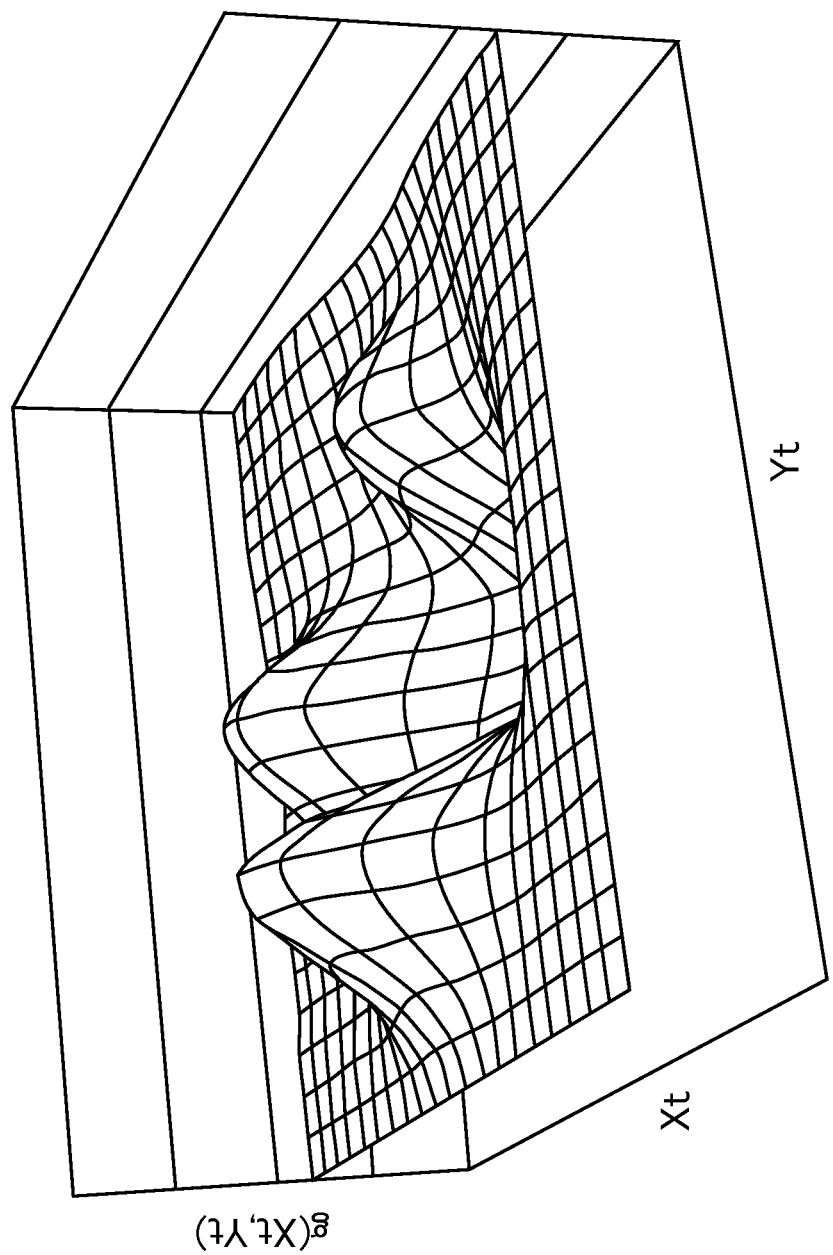
FIG. 6 is a diagram illustrating an example of a relation between touch coordinates and an objective function.

FIG. 6 is a diagram illustrating an example of a relation between the touch coordinates (Xt, Yt) and the objective function g in the objective function g(Xt, Yt, S). FIG. 6 illustrates a case in which S is a constant for ease of explanation. For example, when an influence of S is ignored, (Xt*, Yt*) at which the values of the objective function g(Xt, Yt, S) is minimum, are the touch coordinates to be calculated in FIG. 6.

The coordinate calculation unit CU obtains the values of (Xt, Yt, S) at which the value of the objective function g is minimized through a repetitive numerical solution. For example, a non-linear least squares or a mathematical optimization.

Hereinafter, the least squares linear Taylor differential correction method which is one of the non-linear least squares will be described. This method is a numerical calculation by using a condition that the minimum value of the objective function g occurs when the gradient is zero. That is the following equations are satisfied at the minimum point of the function g.

$$\frac{\partial g}{\partial Xt} = 0 \quad \text{(Ex. 5)}$$

$$\frac{\partial g}{\partial Yt} = 0$$

$$\frac{\partial g}{\partial S} = 0$$

Put values $(Xt_0, Yt_0, S_0)$ are estimate of the optimal solution (Xt*, Yt*, S*) in the vicinity of a point at which the objective function g is minimum. Consider the Taylor series expansion of the function f linearized by approximation to first-order in the vicinity of the estimated value $(Xt_0, Yt_0, S_0)$, and the conditions of Expression 5, the following simultaneous equation is obtained.

$$\sum_i \left[\frac{\partial fi}{\partial c_0}\right]\left[\frac{\partial fi}{\partial c_0}\right]^T \quad \text{(Ex. 6)}$$

-continued $$\delta c = -\sum_i \left[\frac{\partial fi}{\partial c_0}\right](f(xi, yi, Xt_0, Yt_0, S) - Di)$$

Where $c \equiv [Xt\ Yt\ S]^T$ $c_0 \equiv [Xt_0\ Yt_0\ S_0]^T$ $\delta c \equiv c - c_0$ $\left[\frac{\partial fi}{\partial c_0}\right] \equiv$ $\left[\frac{\partial f(xi, yi, c)}{\partial Xt}\bigg|_{c=c_0}\ \frac{\partial f(xi, yi, c)}{\partial Yt}\bigg|_{c=c_0}\ \frac{\partial f(xi, yi, c)}{\partial S}\bigg|_{c=c_0}\right]^T$ Those expressions are linear simultaneous equations related to δc. Therefore, δc is obtained through a Gaussian elimination method. An estimated value $c_0$ is replaced with $c_0+\delta c$ with the use of the obtained δc, and calculation is repeated to obtain the optimal solution (Xt*, Yt*, S*). (Xt*, Yt*) is the calculated touch coordinates. The tentative touch coordinates obtained in Step S102 may be preferably used for an initial value of the estimated value $c_0$ required for a first calculation. As another method, the touch coordinates calculated in the processing of the previous Steps S101 to S107 may be used. This is because when a move in the touch coordinates between the previous processing and the present processing is small, a reduction in the number of repetitive processing can be expected.

The convergence condition of the repetitive calculation may be set so that ∥δc∥ is smaller than a given value. In the calculation of the touch coordinates, because a processing speed is important, there is a need to determine an upper limit of the number of repeating the above-mentioned calculation in a practical use. Hence, the number of repetitive calculations is equal to or lower than the upper limit.

The touch coordinates are thus obtained with the use of the function fitting so that the touched position can be detected with high precision even when a portion close to the end of the sensing area is touched. This is because when the function fitting is used, even if the measurement portion MP corresponding to, for example, a right side of the peak is not present, the touch coordinates can be calculated with the use of a value of the measurement portion MP corresponding to a left side of the peak, or values of the measurement portions MP corresponding to upper and lower portions of the peak.

Also, the processing load of the display panel DP with the touch sensor can be reduced by calculating the touch coordinates through the function fitting only when the touched position is close to the end. Also, in Step S103, information on whether the touch coordinates are calculated through the function fitting, or not, is transmitted to the host substrate HS side. This information can be recognized by a computer. Thus a program can flexibly deal a change of a time interval for acquiring the touch coordinates in case that the time interval is changed depending on whether the function fitting is conducted or not, for example, because of a limit of a calculation capacity of the coordinate calculation unit CU.

In Step S102, it is determined whether the function fitting is conducted, or not, according to whether the tentative touched position is in the edge area, or not. Not only that, but the determination may be conducted on the basis of the size of touch, that is, the number of responsive measurement portions MP, or whether multi-touch is made, or not. For example, in the case of a size as large as the touch screen is touched by a palm, the function f is not applied, and the fitting is difficult. Therefore, such a situation needs to be dealt with through the gravity center calculation or another algorithm. Also, since the multi-touch has a high potential not to require precision, there may arise no problem in the conventional algorithm.

Second Embodiment

Figure 7:
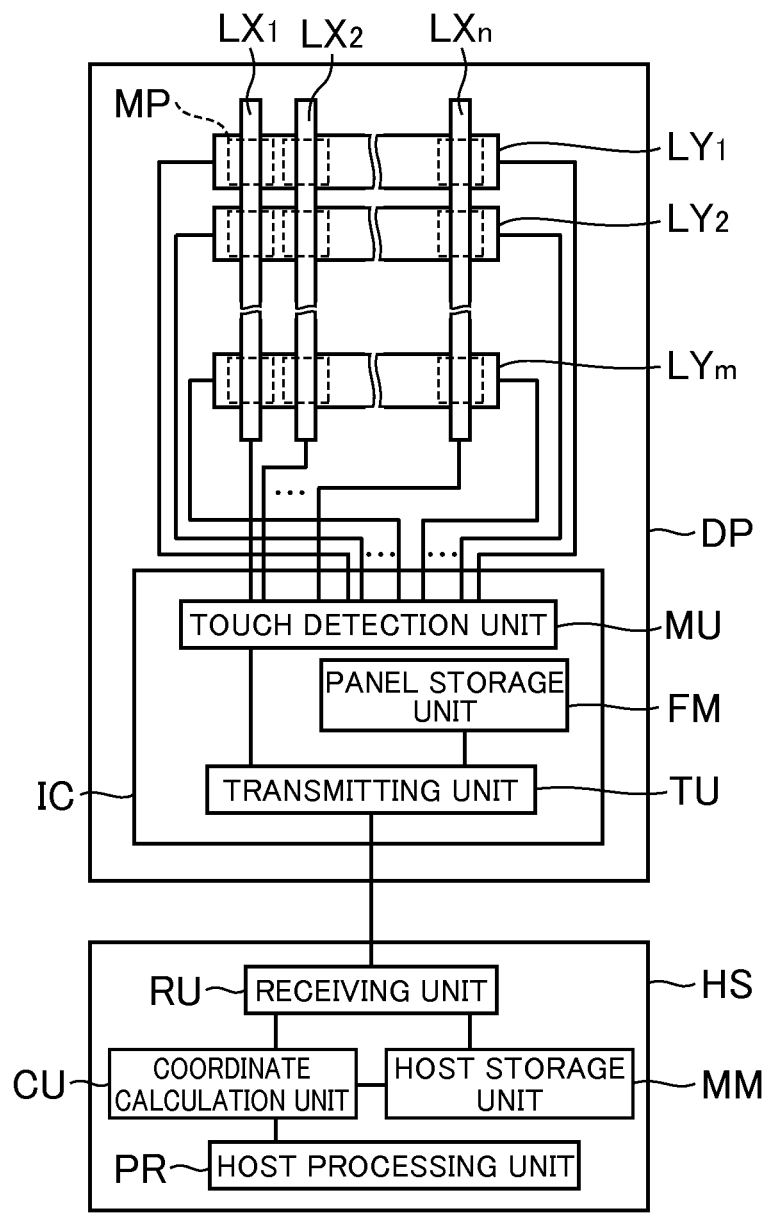
FIG. 7 is a block diagram illustrating an example of a main functional configuration related to touch sensing in a touch sensitive device according to a second embodiment of the invention.

FIG. 7 is a block diagram illustrating an example of a main functional configuration related to touch sensing system according to a second embodiment of the invention. The second embodiment is mainly different from the first embodiment in that the coordinate calculation unit CU is disposed on the host substrate HS side. Hereinafter, differences from the first embodiment will be mainly described.

The touch sensitive screen is equipped with a plurality of X-electrodes LX, a plurality of Y-electrodes LY, and an integrated circuit package IC. A touch detection unit MU, a transmitting unit TU, and a panel storage unit FM are included in the integrated circuit package IC. The panel storage unit FM can be configured by another package different from the integrated circuit package IC. The touch detection unit MU is connected to the X-electrodes LX and the Y-electrodes LY, and acquires a detected signal corresponding to a variation in each mutual capacitance of the measurement portions MP which are arranged at cross points of the X-electrodes LX and the Y-electrodes LY in a matrix. The panel storage unit FM is configured by a nonvolatile memory, and stores characteristic parameter used when calculating the touch coordinates therein.

The transmitting unit TU transmits the calculated measurement values of the respective measurement portions MP, and the characteristic parameter stored in the panel storage unit FM toward the host substrate HS. In the second embodiment, for making data transmission more efficient, it is preferable that the characteristic parameters are transmitted when starting the device with the touch screen.

The host substrate HS includes a host processing unit PR, a host storage unit MM, a receiving unit RU, and a coordinate calculation unit CU. The coordinate calculation unit CU is realized by processing of the same processor as that of the host processing unit PR. The receiving unit RU receives the characteristic parameters transmitted from the transmitting unit TU, and delivers the characteristic parameters to the host storage unit MM at the time of startup, and receives a detected signal value of the touch detected signal transmitted from the transmitting unit TU, and delivers the detected signal value to the coordinate calculation unit CU in a normal operation. The coordinate calculation unit CU calculates the touch coordinates on the basis of the characteristic parameters read from the host storage unit MM and the measurement value of the received touch detected signal. A method for calculating the touch coordinates is identical with that in the first embodiment, and therefore a detailed description thereof will be omitted.

In the second embodiment, the coordinate calculation unit CU is disposed on a side of the host substrate HS. In general, since an arithmetic capacity of the processor which is a main of the host substrate HS is higher than a processing capability of the processor mounted in the display panel DP with the touch sensor, a time required to acquire the touch coordinates can be reduced.

Also, when the characteristic parameters are stored in the panel storage unit FM on a side of the display panel DP with the touch sensor, and transmitted to the host substrate HS side, a difference in the characteristics caused by a manufacturing error of the display panel DP with the touch screen can be allowed. That is, a difference of the individual devices can be dealt with no need of a load of manufacturing and inspection by an excessive quality for rigidly managing the characteristics of the touch sensitive device.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A touch sensing device comprising:
a touch sensor panel;
a sensing area formed on the touch sensor panel for detecting a touch coordinate;
a plurality of first electrodes formed in the sensing area and extending along a first direction;
a plurality of second electrodes formed in the sensing area and extending along a second direction intersected the first direction;
a plurality of cross points of the plurality of first electrodes and the plurality of second electrodes;
a touch detection unit that detects a detected signal value corresponding to the plurality of cross points;
a coordinate calculation unit that calculates tentative touch coordinates based on the detected signal value, and that calculates theoretical values of the plurality of cross points based on the tentative touch coordinates; and
a plurality of connecting wirings formed on the touch sensor panel outside the sensing area,
wherein the plurality of connecting wirings are connected to the plurality of first electrodes and the plurality of second electrodes on an end of the sensing area, respectively,
wherein the coordinate calculation unit determines, based on the tentative touch coordinates, whether a first area within the sensing area is touched, or a second area within the sensing area is touched,
wherein the second area is closer to the end of the sensing area than the first area, and includes an outermost electrode of the plurality of electrodes, and
wherein, in case that the coordinate calculation unit determined the second area is touched, the coordinate calculation unit obtains touch coordinates by calculation using least squares linear Taylor differential correction method with the tentative touch coordinate of the second area, which is an initial value of the calculation.

2. The touch sensing device according to claim 1, wherein the tentative touch coordinates are a centroid of the detected signal value of the plurality of cross points.

3. The touch sensing device according to claim 2, wherein the theoretical values are calculated by a two-dimensional Gaussian function that has a maximum point at the touch coordinates.

4. The touch sensing device according to claim 1, wherein the coordinate calculation unit obtains touch coordinates by a calculation method different from that for the second area if it is determined that the first area is touched.

5. The touch sensing device according to claim 1, wherein the coordinate calculation unit further includes a communication unit that transmits a signal indicative of whether to obtain the touch coordinates.

* * * * *